United States Patent [19]
Fulton

[11] Patent Number: 5,654,601
[45] Date of Patent: Aug. 5, 1997

[54] SWITCHED RELUCTANCE MACHINE

[75] Inventor: Norman Neilson Fulton, West Yorkshire, United Kingdom

[73] Assignee: Switched Reluctance Drives, Ltd., Harrogate, United Kingdom

[21] Appl. No.: 482,967

[22] Filed: Jun. 7, 1995

[30] Foreign Application Priority Data

Mar. 28, 1995 [GB] United Kingdom .......... 9506294

[51] Int. Cl.$^6$ .......... H02K 17/42; H02K 1/00; H02K 1/10
[52] U.S. Cl. .......... 310/168; 310/179; 310/186
[58] Field of Search .......... 310/181, 168, 310/154, 254, 189, 190, 179, 186

[56] References Cited

U.S. PATENT DOCUMENTS

| | | | |
|---|---|---|---|
| 4,158,817 | 5/1979 | Preece et al. | 310/80 |
| 4,647,802 | 3/1987 | Konecny | 310/49 R |
| 4,794,286 | 12/1988 | Taenzer | 310/12 |
| 4,883,999 | 11/1989 | Hendershot | 310/254 |
| 4,995,195 | 2/1991 | Hancock et al. | 29/596 |
| 5,015,903 | 5/1991 | Hancock et al. | 310/168 |
| 5,111,095 | 5/1992 | Hendershot | 310/168 |
| 5,294,856 | 3/1995 | Horst | 310/181 |
| 5,424,595 | 6/1995 | Preston et al. | 310/90.5 |

FOREIGN PATENT DOCUMENTS

| | | |
|---|---|---|
| 2 072 612 | 9/1971 | European Pat. Off. . |
| 0 289 292 | 11/1988 | European Pat. Off. . |
| 0 282 292 B1 | 4/1992 | European Pat. Off. . |
| 2232305 | 5/1990 | United Kingdom . |
| 2240664 | 7/1991 | United Kingdom . |
| 2 262 843 A | 6/1993 | United Kingdom . |
| 2 266 196 A | 10/1993 | United Kingdom . |

OTHER PUBLICATIONS

*Fully Pitched–Winding Switched–Reluctance and Stepping–Motor Arrangements*, IEE Proceedings B. Electrical Power Applications; 140(1993)Jan., No. 1, Part B.

Stephenson and Blake, *The Characteristics, Design and Applications of Switched Reluctance Motors and Drives*, (Jun. 1993, Nuremberg, Germany).

Primary Examiner—Steven L. Stephan
Assistant Examiner—Michael Wallace, Jr.
Attorney, Agent, or Firm—Arnold, White & Durkee

[57] ABSTRACT

A reluctance machine comprises a rotor, defining rotor poles and a stator defining stator poles. Each stator pole pair, creating a flux path through the rotor includes only one winding mounted on one of the stator poles. The invention is particularly applicable to a machine having a four-pole field pattern and an odd number of phases. The coils are placed on alternate stator poles such that the space between stator poles can be used exclusively for a single winding. The single winding is made larger to compensate for the lack of a winding on its associated pole.

22 Claims, 3 Drawing Sheets

1

SWITCHED RELUCTANCE MACHINE

FIELD OF THE INVENTION

This invention relates to reluctance machines. The invention is particularly applicable to a switched reluctance machine whether operated as a motor or a generator.

BACKGROUND OF THE INVENTION

Reluctance machines are electrical machines which produce torque by the tendency of a moving component of the machine to take up a position in which the reluctance of the magnetic circuit is minimized. Typically, at least one of the stator and rotor members has magnetic saliencies which are normally realized in the form of poles projecting from the member.

The switched reluctance machine is a particular form of reluctance machine which has salient poles on both stator and rotor members. In this form they are referred to as 'doubly salient' machines. The torque or electrical output (depending on whether the machine is run as a motor or a generator) is controlled by a controller which regulates the period during which a stator winding is connected electrically with a source of power.

Switched reluctance motors are realized in a variety of forms. In particular, they differ in the number of stator and rotor poles on the stationary and rotating members, respectively, and in the number of independent circuits with which the controller is able separately to switch stator windings in and out of circuit. Each set of windings separately switched in and out of circuit by the controller constitute one phase of the machine. The machine may have one or more such phases.

The theory, design and operation of switched reluctance machines is well documented, for example in the book 'Switched reluctance Motors and their control' by T. J. E. Miller, Clarendon Press, 1993 and the article 'The Characteristics, Design and Applications of Switched Reluctance Motors and Drives' by Stephenson et al., PCIM '93, Jun. 21–24, 1993.

FIG. 1 shows a known form of switched reluctance machine. The stator has six poles (A, A', B, B', C, C') and the rotor four poles. Each stator pole has one coil wound around it. Although only two coils on stator poles A and A' are shown in FIG. 1 for the sake of clarity, it will be appreciated that a similar arrangement would be formed in respect of the other pairs of poles. Typically, the coils on diametrically opposite poles are connected together either in series or in parallel (depending on the nature of the application of the machine) to form a phase of the machine. Thus, the machine in FIG. 1 is a three-phase machine in which the windings of one phase are switchable independently from those of the other phases. When the machine is operated, each phase is normally connected to a source of electrical power through one or more electronic switches t as shown in FIG. 2. The method of operation of such a machine using the switching circuit of FIG. 2 will be well known to the skilled person and is documented in the above references.

In general, the number of poles in a stator is such that each phase has an even number of coils associated with it. In the example of FIG. 1, each of the three phases has two coils, so the machine has six stator poles. In the example of FIG. 3 each of the three phases are made up of four coils symmetrically disposed around the stator, giving a twelve-pole stator. It will be appreciated that various combinations of numbers of rotor poles and stator poles are possible. The selection of a suitable combination is a matter of design choice for a given application.

When one phase of the machine in FIG. 1 is energized by a voltage being applied to the windings of one of the phases, a magnetic field is set up in the machine. This is shown schematically by the arrowed broken lines in FIG. 1. The lines are a representation of the lines of magnetic flux in the machine when phase A is energized. This field pattern is known as a two-pole field pattern since the magnetic flux crosses the air gap of the machine in two principal places.

Generally, when one phase of the machine of FIG. 3 is energized, a magnetic field is set up as represented by the arrowed broken lines. Such an arrangement is known as four-pole field pattern. By continuing to multiply the number of coils in one phase, field patterns with increasing numbers of poles can be produced. This can be done independently of the number of phases of the machine.

In a conventional machine having one coil on each pole, the coils are sized so that they can be assembled in turn on the poles without obstructing each other. The coils, and the gaps between poles in which they fit, are similar. The coil, when in place, cannot extend angularly past the mid-point between two adjacent stator poles as it would occupy the space available at the expense of the adjacent coil and would also impede insertion of the adjacent coil into its space. Thus, the cross sectional area of a coil side must occupy something less than half the total available cross sectional area between radially projecting adjacent poles. While the machine designer would often wish to make the coil bigger by increasing the cross sectional area to reduce current density and the consequent power loss in the coil, it is not possible to do this without increasing the overall size of the machine.

It is an object of the present invention to provide a reluctance machine structure that allows a larger coil size to be used in relation to a given pole.

It is a further object of the invention to provide a reluctance machine that is easier and cheaper to construct than known reluctance machines.

SUMMARY OF THE INVENTION

According to the present invention, there is provided a doubly salient reluctance machine comprising a stator defining stator poles and a rotor defining rotor poles, at least one pair of the rotor poles being simultaneously alignable with a corresponding pair of the stator poles as the rotor moves relative to the stator, and a phase winding arranged in relation to only one of the said pair of stator poles, the winding being energizable to produce a magnetic field whose path includes the said rotor and stator pole pairs.

This invention is particularly applicable to switched reluctance machines which have a four-pole field pattern (or integral multiples four) and an odd number of phases. However, the invention may also be used on other arrangements of reluctance machines including two-phase machines. The invention consists of placing coils on only one stator pole of a pole pair in the machine. The coils can be designed so that the machine produces the same performance as it would have had if the conventional design practice of placing a coil on both stator poles in a pair had been adopted. Because only one pole in a pair is arranged with a winding, the motor can be designed such that poles adjacent to that bearing the winding do not have windings associated with them. Thus, the space available for the winding is substantially increased as each space between poles can be used exclusively for a single winding.

BRIEF DESCRIPTION OF THE DRAWINGS

The invention can be put into practice in various ways, some of which will now be described by way of example with reference to the accompanying drawings, in which.

DETAILED DESCRIPTION OF THE INVENTION

Figure 3:
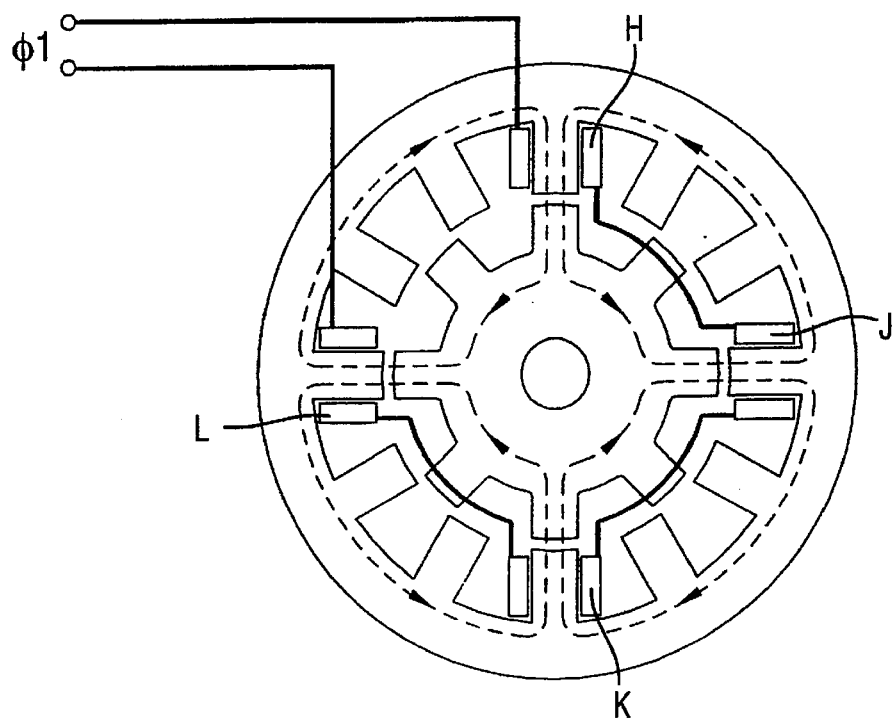
FIG. 3 is a schematic cross section through a further form of conventional reluctance machine.
Figure 4:
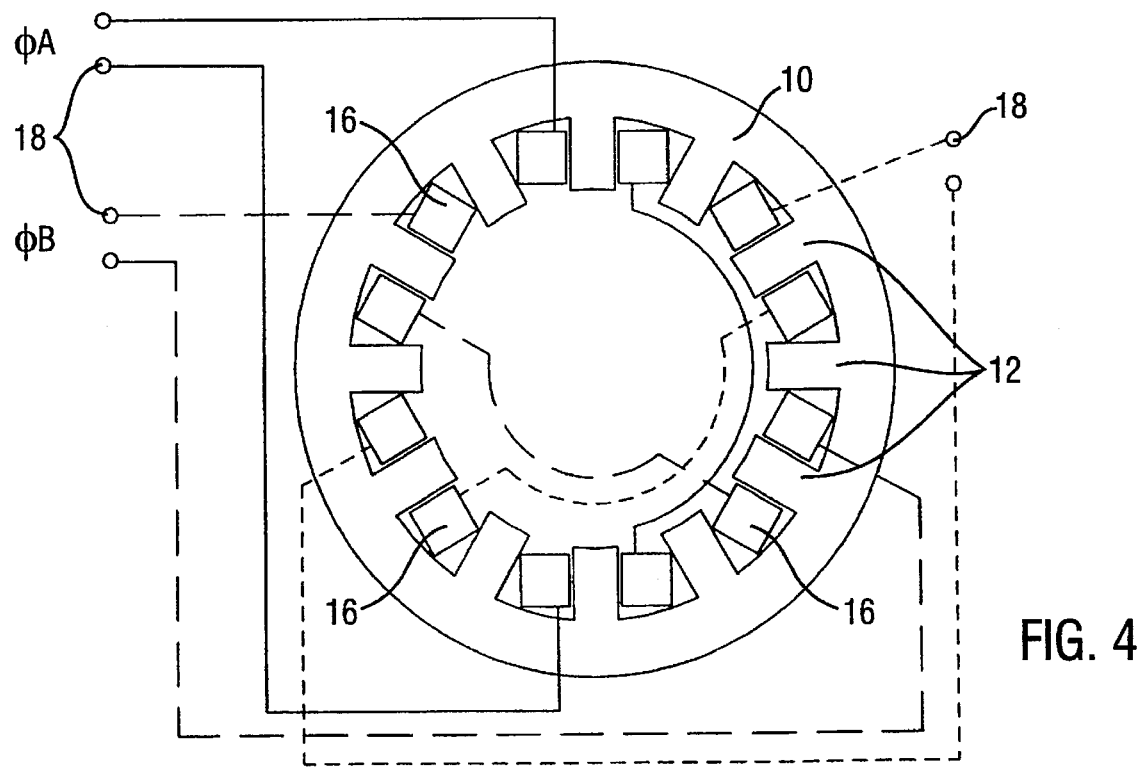
FIG. 4 is a schematic cross section through a reluctance machine according to a first embodiment of the invention.

Referring to FIG. 4 of the drawings, a doubly salient reluctance machine comprises a stator 10 defining twelve equiangularly spaced stator poles 12. For the sake of clarity an eight-pole rotor is not shown in FIG. 4. However, it will be clear to the skilled person that such a rotor would be arranged as in FIG. 3, to rotate within the stator 10.

The stator 10 is fitted with three phase windings ØA, ØB, ØC comprising pairs of coils 16 embracing diametrically opposing stator poles 12 so that alternate stator poles do not have a coil. In this example, the coils 16 in a phase are serially connected between terminals 18 of the phases ØA, ØB and ØC. In an alternative embodiment, the coils are connected in parallel.

Each of the phases is shown as terminating in the terminals 18. For the machine to operate either as a motor or as a generator, these terminals would be switchably connected with a power supply through a controller such that control of the application of a voltage to each of the phases in sequence will produce the required power flow. It will be apparent to the skilled person that the switched reluctance machine uses the same circuit for motoring or generating, only the timing of the voltage pulses changes to alter the direction of power flow from/to the supply.

It will be seen from inspection of FIG. 3 that the flux pattern is set up in the circuit of a reluctance machine by the magnetomotive force (MMF) produced by the four coils of a conventional four-pole machine. If, say, coil J of FIG. 3 were to be placed around coil H and coil L were to be placed around coil K, the total MMF being applied to the magnetic circuit would be unchanged. If then coils H and J were combined into one coil, with the same number of turns as coils H and J in total, and also coils K and L are similarly combined, the machine has the form shown in FIG. 4 which is according to the invention. The machine only has coils on alternate poles of the phase, but has substantially the same performance as the machine of FIG. 3.

Figure 1:
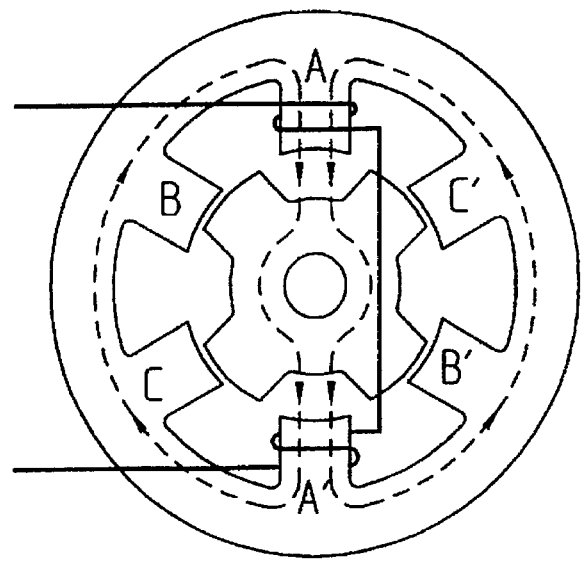
FIG. 1 is a schematic cross section through a conventional reluctance machine.
Figure 2:
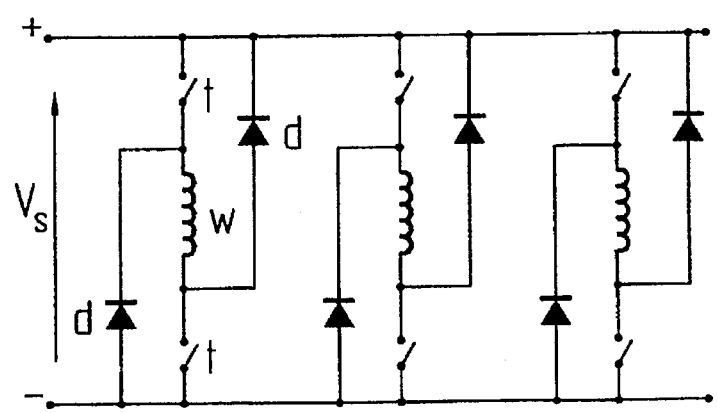
FIG. 2 is a circuit diagram showing the principal power handling components of a switching circuit for the machine of FIG. 1.
Figure 5:
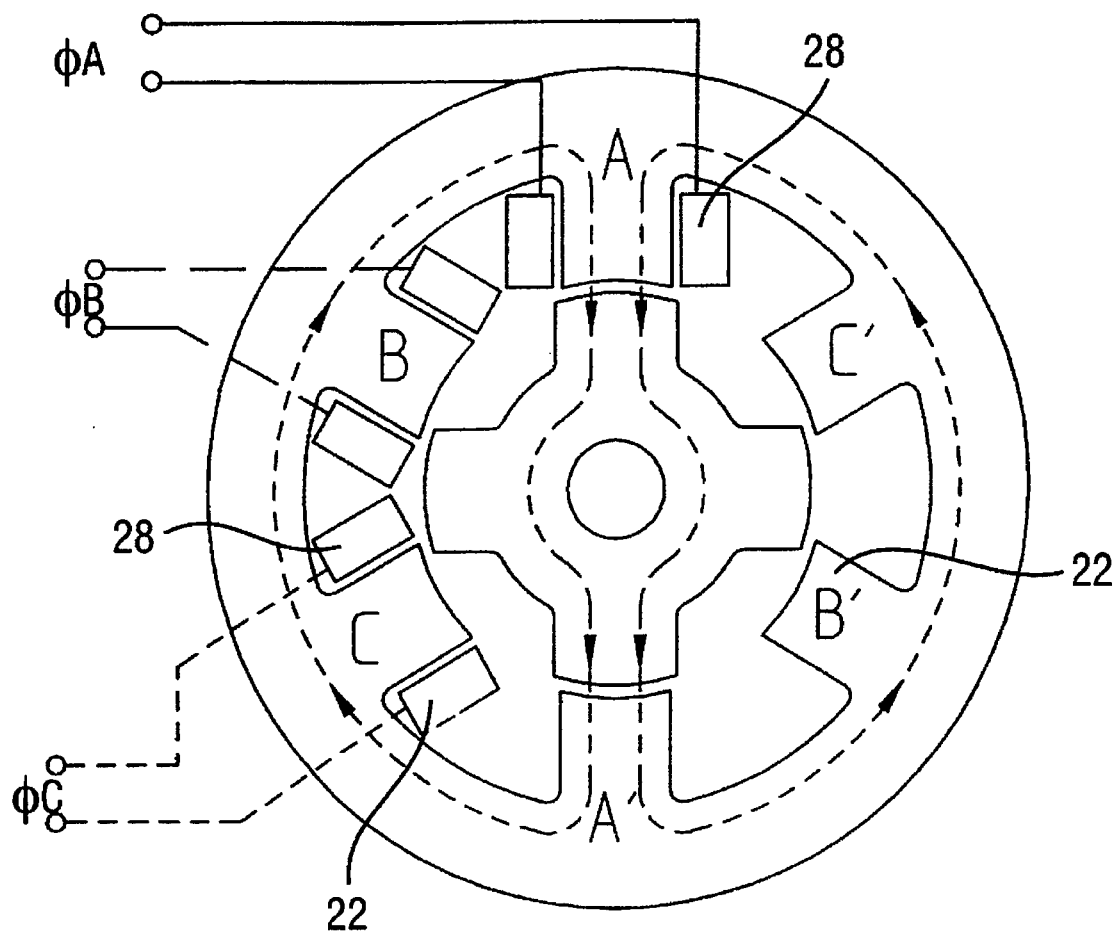
FIG. 5 is a schematic cross section through a reluctance machine according to a further embodiment of the invention.

In FIG. 5 a doubly salient reluctance machine according to the invention derived from that in FIG. 1 is shown. A stator 20 defines six stator poles 22 and a rotor 24 defines four rotor poles 26. Again, the pairs of coils associated with each of the three phases ØA, ØB, ØC is combined in coils 28 on one stator pole of a pair in a 2-pole field pattern. The coil in the inventive machine would be arranged to carry the same ampere-turns as a conventional machine for substantially the same performance. However, there is a disadvantage in this 2-pole field pattern arrangement in that the coils which remain are still adjacent each other.

The present invention can be implemented to best effect on switched reluctance machines having an odd number of phases and a field pattern with an integral multiple of four poles. Because of the geometry of the stator in such a machine, it will be seen that, if the coils are laid out on the poles according to the invention, the alternate coils in the phases are on alternate poles in the stator. This in turn allows the coils to be considerably bigger because of the alleviated space restriction. Even though the coils have twice as many rams as they would have had in a conventional machine they can maintain, or even have increased, the cross-sectional area per turn. This enables an equivalent machine to operate with at least no degradation of performance for the four-pole field pattern. In addition, there are manufacturing advantages since there are half the coils to wind, half the poles to insulate and half the phase connections to make. This leads to both cost reductions and increased reliability through a reduced component current.

It will be appreciated by the skilled person that, while the invention is described in relation to rotary machines, it is equally applicable to linear reluctance machines. In a linear machine the moving member is often still referred to as a rotor. The term rotor, as used here, is intended to embrace such rotors of linear machines. Again, the space created by the absence of pairs of coils in the same slot between stator poles can be used to the same advantage. The reduced number of connections, coils and insulating components in the coil arrangement of this invention will reduce manufacturing costs and time.

While the invention has been described in connection with the illustrative embodiments discussed above, those skilled in the art will recognize that many variations may be made without departing from the present invention. For example, the present invention is applicable to inverted machines in which the stator is in the centre of the machine and the rotor is arranged to rotate around the outside of the stator. Accordingly, the above description of several embodiments is made by way of example and not for the purposes of limitation. The present invention is intended to be limited only by the scope of the following claims.

What is claimed is:

1. A doubly salient reluctance machine comprising a stator defining a plurality of stator pole pairs and a rotor defining rotor poles, at least one pair of the rotor poles being simultaneously alignable with a corresponding stator pole pair as the rotor moves relative to the stator, and a plurality of phase windings, where each phase winding corresponds to a stator pole pair and where each phase winding encircles to only one stator pole in the corresponding stator pole pair, the winding being energizable in a magnetic field whose path includes the said rotor pole pair and the corresponding stator pole pair.

2. The machine of claim 1 in which the poles define a two-pole field pattern.

3. The machine of claim 1 in which the poles define a 2n-pole field pattern (where n is an integer greater than 1) 2n stator poles of which are alignable with 2n rotor poles simultaneously, the stator poles having n windings.

4. The machine of claim 3 in which n=2.

5. The machine of claim 1 in which a phase of the machine comprises a plurality of pairs of stator poles.

6. The machine of claim 5 in which each phase of the machine comprise a plurality of pairs of stator poles.

7. The machine of claim 2 in which a phase of the machine comprises a plurality of pairs of stator poles.

8. The machine of claim 7 in which each phase of the machine comprise a plurality of pairs of stator poles.

9. The machine of claim 3 in which a phase of the machine comprises a plurality of pairs of stator poles.

10. The machine of claim 9 in which each phase of the machine comprise a plurality of pairs of stator poles.

11. The machine of claim 4 in which a phase of the machine comprises a plurality of pairs of stator poles.

12. The machine of claim 11 in which each phase of the machine comprise a plurality of pairs of stator poles.

13. The machine of claim 5 in which the windings are connected together in series.

14. The machine of claim 7 in which the windings are connected together in series.

15. The machine of claim 9 in which the windings are connected together in series.

16. The machine of claim 11 which the windings are connected together in series.

17. The machine of claim 5 in which the windings are connected in parallel.

18. The machine of claim 7 in which the windings are connected in parallel.

19. The machine of claim 9 in which the windings are connected in parallel.

20. The machine of claim 11 in which the windings are connected in parallel.

21. A method of constructing a doubly salient reluctance machine comprising a stator defining a plurality of stator pole pairs and a rotor defining rotor poles, at least one pair of the rotor poles being simultaneously alignable with a corresponding pair of the stator poles as the rotor moves relative to the stator, the method comprising winding a plurality of phase windings, where each phase winding corresponds to one of the stator pole pairs and where each phase winding encircles only one stator pole of the corresponding pair of stator poles, such that each phase winding is energizable in a magnetic field whose path includes the said rotor pole pair and the corresponding stator pole pair.

22. A doubly salient reluctance machine comprising:

a stator defining a plurality of stator pole pairs, the stator defining a plurality of inter-pole stator slots;

a rotor defining rotor poles, at least one pair of the rotor poles being simultaneously alignable with a corresponding stator pole pair as the rotor moves relative to the stator;

and a plurality of phase windings, where each phase winding comprises a plurality of conductors positioned in the inter-pole stator slots and where each phase winding corresponds to a stator pole pair and where each phase winding encircles only one stator pole in the corresponding stator pole pair, the winding being energizable in a magnetic field whose path includes the rotor pole pair and the corresponding stator pole pair, wherein each inter-pole stator slot is substantially filled with conductors from one of the phase windings.

* * * * *

UNITED STATES PATENT AND TRADEMARK OFFICE
CERTIFICATE OF CORRECTION

| | | |
|---|---|---|
| PATENT NO. | : | 5,654,601 |
| DATED | : | August 5, 1997 |
| INVENTOR(S) | : | Norman Neilson Fulton |

It is certified that error appears in the above-identified patent and that said Letters Patent is hereby corrected as shown below:

On the title page, under the heading labeled "References Cited", following the subheading labeled "U.S. PATENT DOCUMENTS", please delete "4,158,817" and insert therefor --4,156,817--.

On the title page, under the heading labeled "References Cited", under the subheading labeled "FOREIGN PATENT DOCUMENTS", before "0 289 292" and following "9/1971", please delete "European Pat. Off." and insert therefor --France--.

In column 4, line 10, please delete "rams" and insert therefor --turns--.

In the claims, in claim 1, column 4, line 49, before "only" and following "encircles", please delete "to".

Signed and Sealed this

Twentieth Day of January, 1998

Attest:

BRUCE LEHMAN

*Attesting Officer*

*Commissioner of Patents and Trademarks*